United States Patent
Wallace et al.

(10) Patent No.: US 8,284,314 B2
(45) Date of Patent: Oct. 9, 2012

(54) ADAPTIVE EDGE ENHANCEMENT USING DIRECTIONAL COMPONENTS FROM NON-LINEAR FILTERING

(75) Inventors: Bradley Arthur Wallace, Austin, TX (US); James Christopher Lynch, West Lake Hills, TX (US)

(73) Assignee: Vixs Systems, Inc., Toronto, Ontario (CA)

( * ) Notice: Subject to any disclaimer, the term of this patent is extended or adjusted under 35 U.S.C. 154(b) by 439 days.

(21) Appl. No.: 12/639,353

(22) Filed: Dec. 16, 2009

(65) Prior Publication Data

US 2011/0141368 A1 Jun. 16, 2011

(51) Int. Cl.
 *H04N 5/21* (2006.01)
 *H04N 5/213* (2006.01)
 *G06K 9/40* (2006.01)
(52) U.S. Cl. ......... 348/625; 348/606; 382/263; 382/266
(58) Field of Classification Search .................. 348/252, 348/606, 607, 626, 627, 458, 625; 345/611; 382/260, 263, 266; 358/447
See application file for complete search history.

(56) References Cited

U.S. PATENT DOCUMENTS

| | | | | |
|---|---|---|---|---|
| 5,526,446 | A * | 6/1996 | Adelson et al. | 382/275 |
| 5,799,111 | A * | 8/1998 | Guissin | 382/254 |
| 5,920,356 | A * | 7/1999 | Gupta et al. | 348/606 |
| 6,229,578 | B1 * | 5/2001 | Acharya et al. | 348/607 |
| 7,176,983 | B2 * | 2/2007 | Chiang et al. | 348/630 |
| 7,424,168 | B2 * | 9/2008 | Daly et al. | 382/264 |
| 7,437,013 | B2 * | 10/2008 | Anderson | 382/261 |
| 7,668,387 | B2 | 2/2010 | Ali | |
| 7,676,103 | B2 | 3/2010 | Ali | |
| 7,782,401 | B1 * | 8/2010 | Chou | 348/581 |
| 7,907,215 | B2 * | 3/2011 | Fok | 348/625 |

(Continued)

FOREIGN PATENT DOCUMENTS

JP 2009301331 A 12/2009

(Continued)

OTHER PUBLICATIONS

Jinsoo Cho, "Adaptively Rate-Controlled Shoot Suppression," IEEE Transactions on Consumer Electronics, vol. 52, No. 4, Nov. 2006, pp. 1398-1402.

(Continued)

*Primary Examiner* — Victor Kostak

(57) ABSTRACT

A video processing device includes an input to receive pixel values for a set of pixels comprising a pixel window substantially centered around a select pixel that initially has a first pixel value. The video processing device further includes a first filter unit to determine a horizontal transient improvement value based on non-linear filtering of the pixel values in a horizontal direction, a second filter unit to determine a vertical transient improvement value based on non-linear filtering of the pixel values in a vertical direction, a third filter unit to determine a first diagonal transient improvement value based on non-linear filtering of the pixel values in a first diagonal direction, and a fourth filter unit to determine a second diagonal transient improvement value based on non-linear filtering of the pixel values in a second diagonal direction that is perpendicular to the first diagonal direction. The video processing device also includes an output to provide a second pixel value for the select pixel, the second pixel value based on the first pixel value, the vertical transient improvement value, the horizontal transient improvement value, the first diagonal transient improvement value, and the second diagonal transient improvement value.

23 Claims, 3 Drawing Sheets

U.S. PATENT DOCUMENTS

| | | | |
|---|---|---|---|
| 2003/0156223 A1* | 8/2003 | Min | 348/625 |
| 2005/0012866 A1* | 1/2005 | Chiang et al. | 348/625 |
| 2006/0078220 A1* | 4/2006 | Okubo et al. | 382/261 |
| 2006/0139376 A1* | 6/2006 | Le Dinh et al. | 345/660 |
| 2006/0262989 A1 | 11/2006 | Tegenbosch et al. | |
| 2007/0279530 A1* | 12/2007 | Fok | 348/625 |
| 2008/0031538 A1 | 2/2008 | Jiang et al. | |
| 2009/0169102 A1* | 7/2009 | Zhang et al. | 382/167 |
| 2009/0324087 A1 | 12/2009 | Kletter | |

FOREIGN PATENT DOCUMENTS

| | | |
|---|---|---|
| WO | 2007002309 A2 | 1/2007 |

OTHER PUBLICATIONS

Jinsoo Cho et al., "Edge-Adaptive Local Min/Max Nonlinear Filter-Based Shoot Suppression," IEEE Transactions on Consumer Electronics, vol. 52, No. 3, Aug. 2006, pp. 1107-1111.

Jinsoo Cho et al., "Color Transient Improvement with Transient Detection and Variable Length Nonlinear Filtering," IEEE Transactions on Consumer Electronics, vol. 54, No. 4, Nov. 2008, pp. 1873-1879.

Rafael C. Gonzalez et al., "Digital Image Processing," Third Edition, Pearson/Prentice Hall, Aug. 2007, pp. 157-168.

Kazmi, J. et al., "Enhanced MRA Images Quality Using Structure Adaptive Noise Filter and Edge Sharpening Methods," Malaysian Journal of Computer Science, vol. 20(2), 2007, pp. 99-114.

European Search Report mailed Apr. 8, 2011 for EP 10195190.3, 10 pages.

Aoki, K. et al., "A Cascade Configuration of the Edge-Weighted Image Enhancement Filter," Electronics and Communications in Japan, Part 3, vol. 90, No. 6, Wiley Periodicals, Inc., Jan. 1, 2007, XP-001542159, pp. 37-47.

Cheikh, F.A. et al., "Directional-Rational Approach for Color Image Enhancement," IEEE International Symposium on Circuits and Systems, May 28-31, vol. 3, 2000, Geneva, Switzerland, XP-002629894, 4 pages.

Polesel, A. et al., "Image Enhancement via Adaptive Unsharp Masking," IEEE Transactions on Image Processing, vol. 9, No. 3, Mar. 1, 2000, XP-6556774, pp. 505-510.

Ramponi, G. et al., "Nonlinear Unsharp Masking Methods for Image Contrast Enhancement," Journal of Electronic Imaging, vol. 5, No. 3, Jul. 1996, XP-002629893, pp. 353-366.

\* cited by examiner

ABSTRACT EDGE ENHANCEMENT USING
DIRECTIONAL COMPONENTS FROM
NON-LINEAR FILTERING

FIELD OF THE DISCLOSURE

The present disclosure relates generally to video processing and more particularly to edge enhancement in video content.

BACKGROUND

Video systems often employ edge enhancement to improve image sharpness. Edge enhancement techniques typically employ sharpening spatial filters which are subject to considerable overshoot and undershoot, thereby introducing "ringing" visual artifacts in the resulting image. Conventional approaches to reduce or eliminate undershoot and overshoot are complex and involve substantial computational throughput, and thus are costly and inefficient to implement in video processing systems.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate exemplary techniques for edge enhancement in video images at a video processing device. In one embodiment, each of four directional filter units determines a transient improvement value for a corresponding direction (horizontal, vertical, positive diagonal, and negative diagonal) by applying non-linear filtering using those pixel values of a pixel window centered around a select pixel that are collinear with the select pixel in a corresponding direction. The non-linear filtering can include determining a second-order derivative approximation between collinear pixels in the pixel window in the corresponding direction and then scaling the second-order derivative approximation by a scaling value that is based on a first-order derivative approximation between the collinear pixels so as to increase high-frequency components without substantially enhancing noise. The resulting value of this scaling process is the direction-specific transient improvement value for the corresponding direction. This direction-specific transient improvement then may be summed with the original pixel value of the select pixel, or a smoothed representation thereof, to generate a direction-specific enhanced pixel value for the select pixel value. The transient improvement values determined fore each of the four directions may be summed along with the original pixel value for the select pixel to determine a new, enhanced pixel value for the select pixel. Further, in at least one embodiment, each directional filter unit additionally can include a shoot suppression module that monitors for potential undershoot or overshoot in the direction-specific enhanced pixel value generated by the directional filter unit, and provide a dampened pixel value relating to either a maximum of the collinear pixel values (for instances of overshoot) or the minimum of the collinear pixel values (for instances of undershoot) in place of the enhanced pixel value in the event that undershoot/overshoot is detected. Because the processes performed by the directional filter unit introduce high-frequency components in the resulting edge-enhanced image, a linear unsharp mask can be applied to the generated stream of enhanced pixel values to enhance these high-frequency components in the resulting sharpened image.

Figure 1:
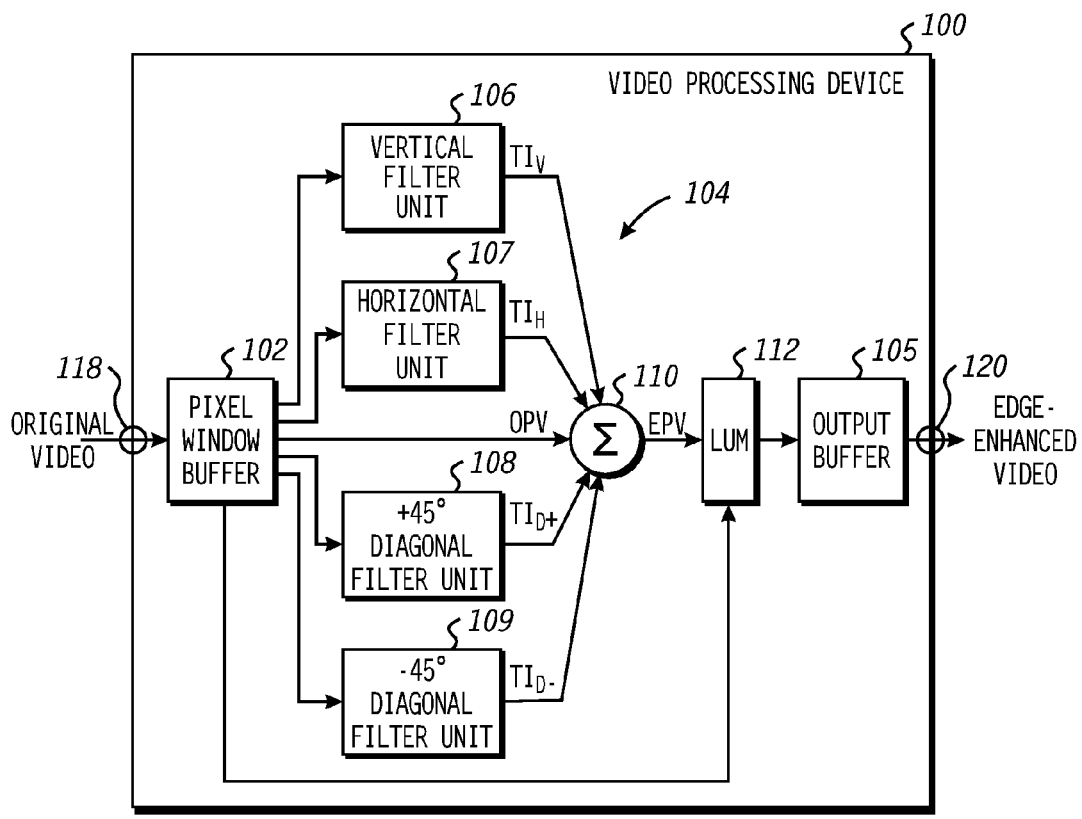
FIG. 1 is a block diagram illustrating a video processing device employing adaptive edge enhancement using directional components from non-linear filtering in accordance with at least one embodiment of the present disclosure.
Figure 2:
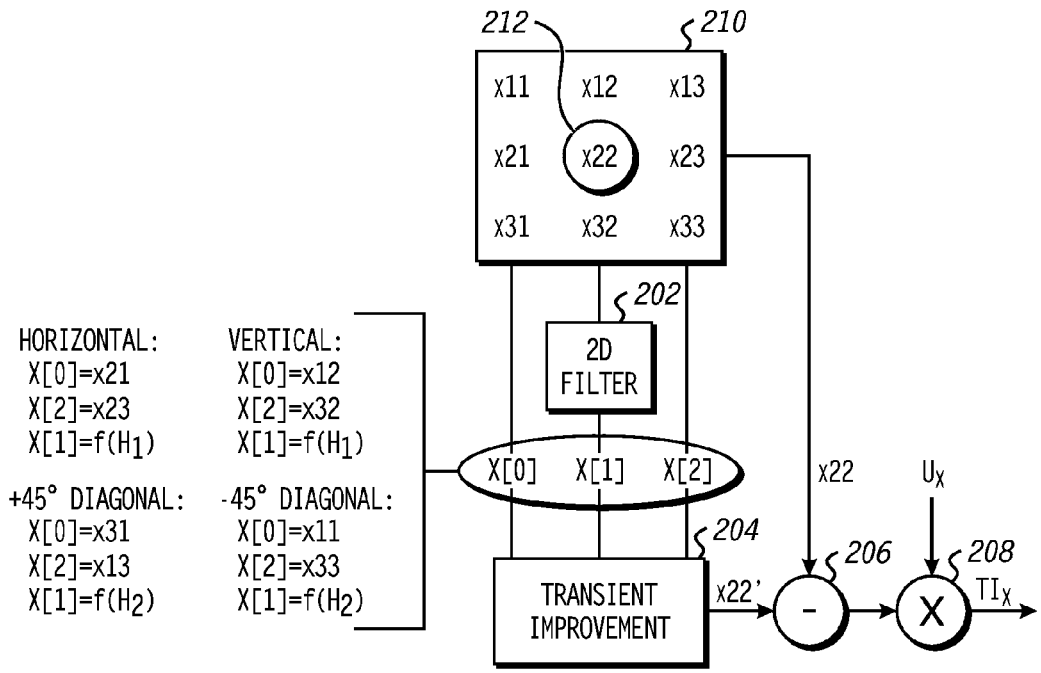
FIG. 2 is a diagram illustrating an example implementation of a directional filter unit of the edge enhancement unit of FIG. 1 in accordance with at least one embodiment of the present disclosure.
Figure 3:
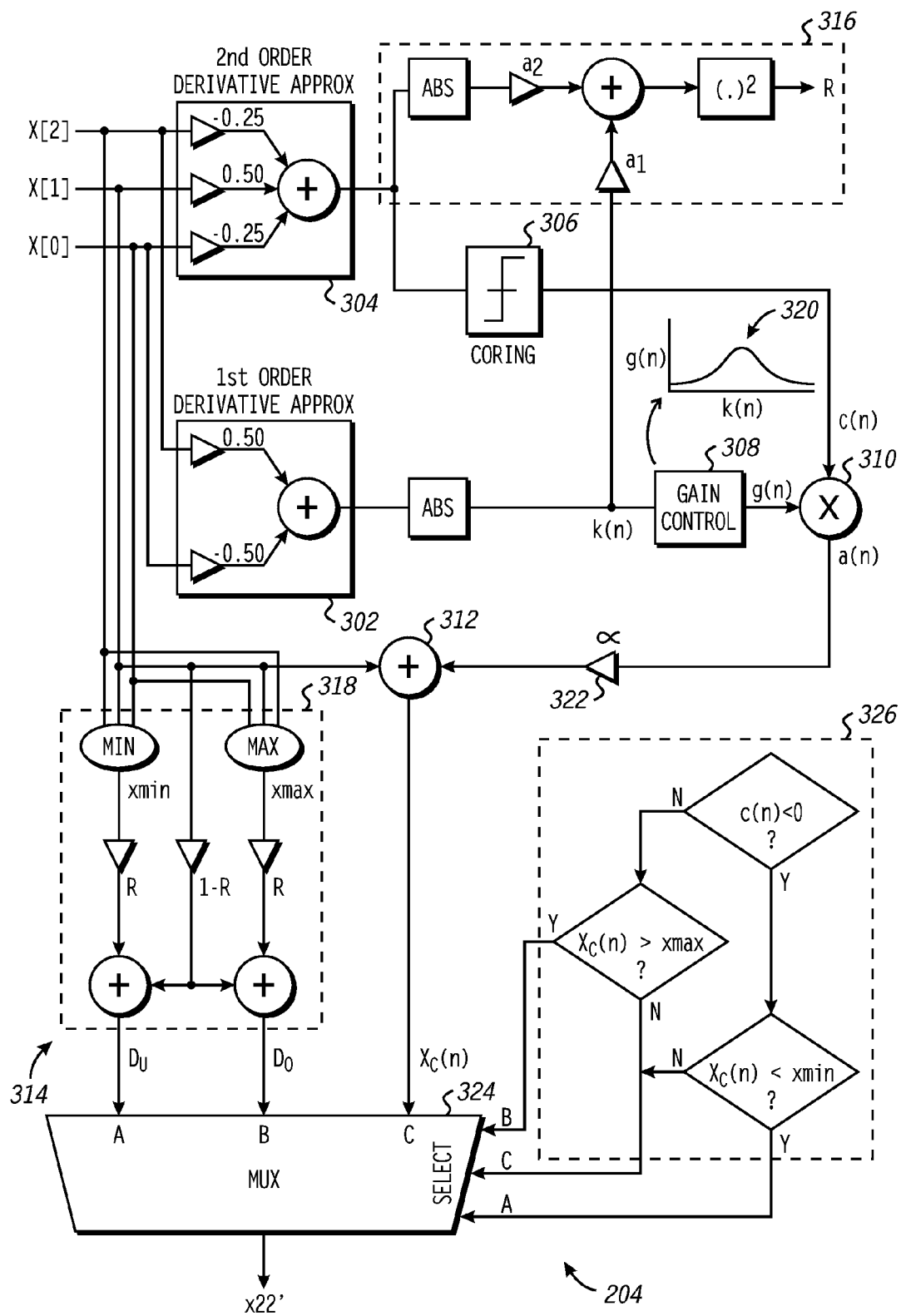
FIG. 3 is a diagram illustrating an example implementation of a transient improvement module of the directional filter unit of FIG. 2 in accordance with at least one embodiment of the present disclosure.

FIG. 1 illustrates a video processing device 100 employing adaptive multi-directional edge enhancement in accordance with at least one embodiment of the present disclosure. The video processing device 100 includes a pixel window buffer 102, an edge enhancement module 104, and an output buffer 105. The edge enhancement module 104 includes a vertical filter unit 106, a horizontal filter unit 107, a positive diagonal filter unit 108, a negative diagonal filter unit 109, and a summation module 110. The edge enhancement module 104 further can include a linear unsharp mask (LUM) module 112. The functionality of the various modules of the video processing device 100 as illustrated in FIGS. 1-3 can be implemented as hardware, firmware, one or more processors executing corresponding software, or a combination thereof. To illustrate, the functionality of certain components can be implemented as discrete circuitry, an application specific integrated circuit (ASIC), a field programmable gate array (FPGA), and the like, while other functions of certain components can be implemented one or more processors of a processing system that execute software instructions. Further, some or all of the components can implemented in a processing device designed based on a set of register-transfer-level (RTL) or Verilog instructions that define the functionality of the processing device and which are synthesized to generate the electrical and electronic design of the processing device.

In operation, the video processing device 100 receives input video data via an input 118 and provides resulting edge-enhanced video data via an output 120. The pixel window buffer 102 buffers pixel data for pixels of a plurality of lines of the input video data. The pixel data may be provided or obtained from any of a variety of sources, such as a frame buffer at the output of a video decoder. Each of filter units 106-109 is configured to generate a corresponding direction-specific transient improvement (TI) value for a select pixel in the pixel window buffer 102 based on a non-linear filtering of a pixel window of pixel values substantially surrounding the select pixel, whereby: the vertical filter unit 106 generates a transient improvement value $TI_V$ based on a non-linear filtering of the pixel window in a vertical direction; the horizontal filter unit 107 generates a transient improvement value $TI_H$ based on a non-linear filtering of the pixel window in a horizontal direction; the positive diagonal filter unit 108 generates a transient improvement value $TI_{D+}$ based on a non-linear filtering of the pixel window in a positive diagonal direction (e.g., +45 degrees); and the negative diagonal filter unit 109 generates a transient improvement value $TI_{D-}$ based on a non-linear filtering of the pixel window in a negative diagonal direction that is perpendicular to the positive diagonal direction (e.g., −45 degrees). Each of the transient improvement values $TI_V$, $TI_H$, $TI_{D+}$, and $TI_{D-}$ represents a sharpness enhancement of the select pixel in the corresponding one of the vertical, horizontal, positive diagonal, and negative diagonal directions. The summation module 110 then sums the original pixel value (OPV) initially associated with the select pixel with some or all of the direction-specific transient improvement values $TI_V$, $TI_H$, $TI_{D+}$, and $TI_{D-}$ to generate an enhanced pixel value (EPV) for the select pixel. This process then may be repeated for the next pixel to be edge-enhanced.

As described in greater detail below, the output stream of enhanced pixel values may have newly-introduced high frequency components due to the non-linear nature of the transient improvement process performed by the filter units 106-109. Accordingly, in one embodiment, the LUM module 112 applies any of a variety of linear unsharp masks to the stream of enhanced pixel values so as to control the gain of the newly-introduced high-frequency components. The resulting pixel value stream is buffered in the output buffer 105 (which may include, for example, a frame buffer). The resulting enhanced pixel values generated by the video processing device 100 then may be provided via the output 120 as edge-enhanced video data to another video processing device (e.g., a display controller, an encoder, etc.).

FIG. 2 illustrates an example implementation of a directional filter unit 200 for generating a transient improvement value for a select pixel in accordance with at least one embodiment of the present disclosure. The directional filter unit 200 corresponds to each of the filter units 106-109, whereby the operations of the filter units 106-109 differ by the direction employed, and thus pixel values used, in the non-linear filtering process. As illustrated, the directional filter unit 200 includes a two-dimensional (2D) smoothing filter 202, a transient improvement module 204, and a subtraction module 206. The directional filter unit 200 further can include a multiplier module 208 for weighing or scaling the resulting transient improvement value by a programmable direction-specific weighting value $u_x$.

In the illustrated example, the non-linear filtering processes employed by the directional filter unit 200 are directed to a 3×3 pixel window 210 that is centered around a select pixel 212 to be enhanced. The pixel value of the select pixel 212 is identified as "x22"; the pixel values of the pixel to the left of the select pixel 212 and to the right of the select pixel 212 on the same line are identified as "x21" and "x23", respectively; the pixel values of the pixels in the line above the select pixel 212 are identified as "x11", "x12", and "x13" (left to right); and the pixel values of the pixels in the line below the select pixel 212 are identified as "x31", "x32", and "x33" (left to right). These pixel values can include, for example, luminance values or chrominance values.

The use of a 3×3 pixel window is advantageous in that this window size involves relatively few pixel values and thus requires relatively low computational effort to perform the processes described herein with respect to the pixel window 210. Further, the vertical, horizontal, and +/−45 degree diagonal orientations are the only possible edge orientations in a 3×3 pixel window and thus no detection of the orientation of a potential edge within the 3×3 pixel window is required for sharpening purposes. However, while a 3×3 pixel window has these advantages in this particular context, the processes described herein are not limited to this particular window size and instead can be extended to use of any of a variety of pixel window sizes using the guidelines provided herein and without departing from the scope of the present disclosure.

The 2D smoothing filter 202 of the directional filter unit 200 generates a smoothed pixel value X[1] based on a linear smoothing/filtering of the pixel value x22 of the select pixel 212 through an application of a filter matrix that deemphasizes or avoids use of the pixel information in the same orientation or direction of interest. To illustrate, for employment of the directional filter unit 200 as the vertical filter unit 106 or the horizontal filter unit 107, a filter matrix $H_1$ is employed so as to deemphasize the pixel information in the diagonal directions of the pixel window 210:

$$H_1 = \begin{bmatrix} b & 0 & b \\ 0 & a & 0 \\ b & 0 & b \end{bmatrix}$$

Conversely, for employment of the directional filter unit 200 as the positive diagonal filter unit 108 or the negative diagonal filter unit 109, a filter matrix $H_2$ is employed so as to deemphasize the pixel information in the horizontal and vertical directions of the pixel window 210:

$$H_2 = \begin{bmatrix} 0 & d & 0 \\ d & c & d \\ 0 & d & 0 \end{bmatrix}$$

whereby the kernel components "a", "b", "c", and "d" can comprise any of a variety of suitable values identified through calculation or empirical analysis. The following values for the matrix components have been found to provide acceptable results:

$$a = \frac{\sqrt{2}}{2}$$

$$b = 0.25 * \left(1 - \frac{\sqrt{2}}{2}\right)$$

$$c = 0.5$$

$$d = 0.5$$

In accordance with the numbering scheme described above for the pixel values of the pixel window 210, the smoothing filter 202 applies the appropriate kernel filter H in accordance with the direction of interest to the pixel values of the pixel window 210 to generate the value X[1] based on calculations represented by the following equation:

$$X[1] = \sum_{i,j} H_{ij} * xij$$

The transient improvement module 204 receives the value X[1] from the smoothing filter 202, as well as the pixel values X[0] and X[2] of pixels of the pixel window 210 on opposing, collinear sides of the select pixel 212 in the particular direction of interest. As the vertical filter unit 106 provides vertical sharpness filtering, the transient improvement module 204 of the vertical filter unit 106 would use the pixel values x12 and x32 for X[0] and X[2], respectively. The horizontal filter unit 107 provides horizontal sharpness filtering and thus the transient improvement module 204 of the horizontal filter 107 would use the pixel values x21 and x23 for X[01] and X[2], respectively. The positive diagonal filter unit 108 provides sharpness filtering in the +45 degree direction and thus the transient improvement module 204 for the positive diagonal filter unit 108 would use the values x31 and x13 for X[0] and X[2], respectively. The negative diagonal filter unit 109 provides sharpness in the −45 degree direction and thus the transient improvement module 204 for the negative diagonal filter unit 109 would use the values x11 and x33 for X[0] and X[2], respectively. Table 1 summarizes the particular relationship between the generalized inputs of the directional filter unit 200 and the particular implementations for the horizontal, vertical, positive diagonal, and negative diagonal directions:

TABLE 1

| Value | Vertical | Horizontal | +45 Diagonal | −45 Diagonal |
|---|---|---|---|---|
| X[0] | x12 | x21 | x31 | x11 |
| X[1] | $H_1$ filter matrix | $H_1$ filter matrix | $H_2$ filter matrix | $H_2$ filter matrix |
| X[2] | x32 | x23 | x13 | x33 |

Because the vertical and horizontal filter units 106 and 107 use the same filter matrix and thus use the same smoothed pixel value for X[1], the vertical and horizontal filter units 106 and 107 can share the output of a single 2D smoothing filter. For the same reason, the diagonal filter units 108 and 109 can share the output of a single 2D smoothing filter.

Using the smoothed middle pixel value X[1] and the collinear pixel values X[0] and X[2] in the direction of interest, the transient improvement module 204 performs a non-linear filter process, described in greater detail below, to generate a direction-specific enhanced value x22' that represents a sharpness enhancement to the original pixel value x22 of the select pixel 212 in the direction of interest; that is, x22'=x22+ $TI_x$. Thus, to obtain the direction-specific transient improvement value $TI_x$ as a separate value, the subtraction module 206 subtracts the original pixel value x22 from the enhanced pixel value x22'; that is $TI_x$=x22'−x22. In certain instances, it may be advantageous to weight the transient improvement value $TI_x$ by a programmable weighting value $u_x$, whereby the particular weighting value can be independently programmed for each filtering direction and which can be determined through calculation or through empirical analysis. Accordingly, the weighting module 208 can generate a weighted transient improvement value through the multiplication of the transient improvement value $TI_x$ and the weighting value $u_x$. An example value for the weighting value $u_x$ of ⅓ for each direction has been found to provide effective results. Reference herein to the transient improvement value provided by a directional filtering unit can include either an unweighted transient improvement value or a weighted transient improvement value unless noted otherwise.

FIG. 3 illustrates an example implementation of the transient improvement module 204 of the directional filter unit 200 of FIG. 2 in accordance with at least one embodiment of the present disclosure. In the depicted example, the transient improvement module 204 includes a first-order derivative module 302, a second-order derivative module 304, a coring filter 306, a gain control module 308, a multiplier 310, an adder 312, and a shoot suppression module 314. The shoot suppression module 314 includes a factor calculation module 316, a min/max module 318, selection logic 320, and a multiplexer 324.

In operation, the first-order derivative module 302 and the second-order derivative module 304 determine approximations of the first-order and second-order derivatives, respectively, of the smoothed middle pixel value X[1] and the two collinear pixel values X[0] and X[2] using, for example, the operators:

$$\frac{\partial x}{\partial n} \cong 0.5 * x(n+1) - 0.5 * x(n-1)$$

$$-\frac{\partial^2 x}{\partial n^2} \cong 0 - 0.25 * x(n+1) + 0.5 * x(n) - 0.25 x(n-1)$$

whereby the second-order derivative module 304 determines a negative approximation of the second-order derivative for convenience. It will be appreciated that, in this context, the first-order derivative is zero in areas of constant intensity, non-zero in areas of an onset of a change in intensity, and non-zero along changes in intensity, whereas the second-order derivative is zero in areas of areas of constant intensity and areas of constant change in intensity, and non-zero at the onset and end of a change in intensity. As such, the first-order derivative approximation is useful as an indicator of an edge in the local image region represented by the pixel window 210, and the second-order derivative approximation is useful as an indicator of the borders of the edge.

In a conventional edge-enhancement process using a typical linear unsharp mask (LUM), the negative of the second-order derivative approximation value simply would be scaled and added to the original pixel value to generate an enhanced value for the pixel at issue. However, this approach results in visual artifacts of ringing (due to introduced over/undershoot) and noise enhancement. To avoid such issues, the transient improvement module 204 employs the coring filter 306 to filter out noise by setting an output value c(n) to zero if the absolute value of the second-order derivative approximation value is below a certain threshold, and otherwise outputting the negative of the second-order derivative approximation value as the output value c(n).

To reduce ringing and to further guard against noise, the gain control module 308 uses a measurement of the local region to control an amount of high-frequency component added to the transient value $TI_x$ generated by the transient improvement module 204 through use of a gain value g(n) used to scale the output value c(n) by the multiplier module 310. As such, the gain control module 308 uses the absolute value of the first-order derivative approximation (denoted k(n) in FIG. 3) to assess the slope of the local region in the direction of interest. As illustrated by chart 320, which depicts an example correlation between the input values for k(n) to corresponding output values for a gain value g(n) output by the gain control module 308, the relationship between the absolute value of the first-order derivative approximation value k(n) and the gain control value g(n) provided by the gain control module 308 can have a relatively bell-shaped curve such that the gain control value g(n) is relatively small where k(n) is relatively small or relatively large, and the gain control value g(n) is relatively large where k(n) falls between these two extremes. The purpose of this relationship is to deemphasize the transient improvement value through the gain control value g(n) when there is potential for over/undershoot and noise when no further sharpening of the pixel would be advantageous. To illustrate, if the slope represented by the first-order derivative approximation value is relatively high (and thus represented by the far right of the chart 320), the represented edge likely is already sufficiently sharp and any further sharpening likely will result in ringing, and if the slope is relatively small (and thus represented by the far left of the chart 320), there likely is no significant edge in the region and thus an attempt to sharpen the region likely will only result in increased noise. Accordingly, the gain control module 308 scales back the gain control value g(n) in such instances. In one embodiment, the gain control module 308 implements the relationship between the input first-order derivative approximation value k(n) and the corresponding gain control value g(n) as a look-up table or other data structure linking a particular value for k(n) to a particular value for g(n) in accordance with a desired emphasis relationship, such as that shown by chart 320.

The gain control value g(n) is used to control the gain of a high-frequency component c(n) generated through a multiplication of the second-order derivative approximation value c(n) and the gain control value g(n) by the multiplier module 310 to generate a scaled value a(n); that is, a(n)=g(n)*c(n). A digital multiplier 322 can multiply the scaled value a(n) by a programmable constant gain factor α and then add the resulting scaled value α*a(n) to the original smoothed pixel value X[1] to generate an enhanced pixel value $X_c(n)$, whereby Xc(n)=x22+α*a(n) and thus α*a(n) represents a potential value for the transient improvement value $T_x$ in the direction of interest.

In one embodiment, the enhanced pixel value $X_c(n)$ can be output as the direction-specific edge-enhanced value x22' for the select pixel 212 without further processing. However, the processes used to generate the enhanced pixel value $X_c(n)$ may potentially be subject to some degree of undershoot/overshoot. Accordingly, in an alternate embodiment, the shoot suppression module 314 is used to check for undershoot/overshoot and then dampen the enhanced pixel value $X_c(n)$ in the event that undershoot/overshoot is detected. In operation, the min/max module 318 determines the minimum value ("xmin") and the maximum value ("xmax") of X[0], X[1], and X[2], and scales these extrema and the smoothed pixel value X[1] by a factor R, and then sums the results based on calculations represented by the following equations to generate two dampened values $D_U$ and $D_O$:

$$D_U = xmin*R + (1-R)*X[1]$$

$$D_O = xmax*R + (1-R)*X[1]$$

As such, the factor R is used to control under/overshoot, thereby controlling the amount of ringing in the final output. In one embodiment, the factor calculation module 316 calculates the factor R by scaling the absolute values of the first-order derivative approximation and the second-order derivative approximation by programmable weights $a_1$ and $a_2$, respectively, summing the scaled results with a value $a_0$ (which may be zero), and then squaring the sum in accordance with the processes represented the equation:

$$R = \left(a_0 + a_1\left|\frac{\partial x}{\partial n}\right| + a_2\left|\frac{\partial^2 x}{\partial n^2}\right|\right)^2$$

If there is a large edge present in the pixel window, R will be relatively large and the output will be limited to xmax or xmin. If there is a small edge, R will be relatively small and output will be limited to input value. As such, the value of R is a measure of strength of the edge.

The dampened values $D_O$ and $D_U$ and the enhanced pixel value $X_c(n)$ are provided as inputs to the multiplexer 324, the output of which is the direction-specific enhanced pixel value x22' for the select pixel 212 (FIG. 2). Thus, the possible values for the enhanced pixel value x22' are the overshoot dampened value $D_o$, the undershoot dampened value $D_U$, and the enhanced pixel value $X_c(n)$. To select between these values, the selection logic 320 analyzes the potential for undershoot/overshoot by analyzing the local extrema xmin and xmax in relation to the value $X_c(n)$, which, as noted above, represents the second-order derivative approximation and thus is indicative of the borders of an edge region. A value of c(n) that is less than zero indicates that the select pixel 212 is at the bottom of a rising edge and thus the value $X_c(n)$ is compared with xmin to determine whether undershoot is present. In the event that the value $X_c(n)$ is less than xmin, thereby indicating undershoot, the select logic 320 controls the multiplexer 324 to output the undershoot dampened value $D_U$ as the enhanced pixel value x22'. Conversely, the value of c(n) being 0 or greater indicates that the select pixel 212 is at the top of a rising edge, and thus the value of $X_c(n)$ is compared with xmax to determine whether overshoot is present. In the event that the value of $X_c(n)$ is greater than xmax, thereby indicating overshoot, the select logic 320 controls the multiplexer 324 to output the overshoot dampened value $D_O$ as the enhanced pixel value x22'. Instances whereby the value $X_c(n)$ is less than xmax when c(n) is 0 or greater or the value of $X_c(n)$ is greater than xmin when c(n) is less than zero indicate that the select pixel 212 is not near the borders of an edge and thus the select logic 320 controls the multiplexer 324 to output the enhanced pixel $X_c(n)$ as the direction-specific enhanced pixel value x22' for the select pixel 212.

The damping process provided by the shoot suppression module 314 has a non-linear affect and thus can introduce new high frequency components into the output stream of enhanced pixel values. Accordingly, as noted above, the LUM module 112 (FIG. 1) can be used to filter the non-linearities introduced by the shoot suppression process so as to accentuate the high-frequency components of the enhanced pixel stream As noted above, the modules of the video processing device 100 of FIGS. 1-3 can be implemented as hardware. However, in addition to hardware implementations adapted to perform the functionality in accordance with one of the embodiments of the present disclosure, such modules may also be embodied in one or more processors configured to execute instructions in software disposed, for example, in a computer usable (e.g., readable) medium configured to store the software (e.g., a computer readable program code). The program code causes the enablement of embodiments of the present invention, including the following embodiments: (i) the functions of the devices and methods disclosed herein (such as devices and methods upscaling/deinterlacing video); (ii) the fabrication of the devices and methods disclosed herein (such as the fabrication of devices that are enabled to upscale or deinterlace video); or (iii) a combination of the functions and fabrication of the devices and methods disclosed herein.

For example, this can be accomplished through the use of general programming languages (such as C or C++), hardware description languages (HDL) including Verilog, Verilog-A, HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM) and as a computer data signal embodied in a computer usable (e.g., readable) transmission medium (such as a digital, optical, or analog-based medium). It is understood that the functions accomplished and/or structure provided by the systems and techniques described above can be represented in a core (such as a GPU core) that is embodied in program code and may be transformed to hardware as part of the production of integrated circuits.

Figure 4:
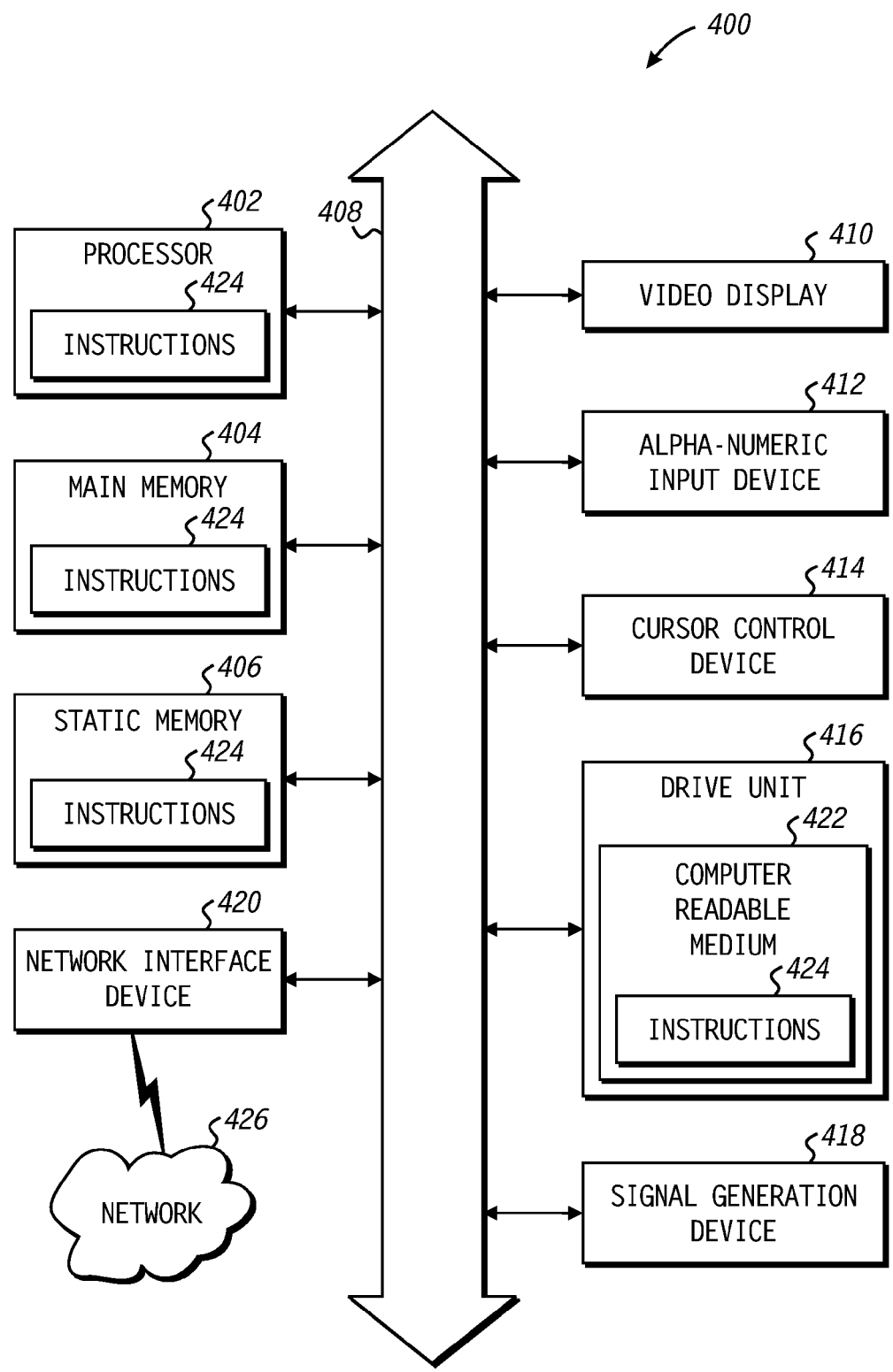
FIG. 4 is a diagram illustrating an example system for implementing the video processing device of FIG. 1 in accordance with at least one embodiment of the present disclosure.

FIG. 4 illustrates a processing system 400 in accordance with at least one embodiment of the present disclosure. The processing system 400 can include a set of instructions that can be executed to manipulate the processing system 400 to perform any one or more of the methods or functions disclosed herein. The processing system 400 may operate as a standalone device or may be connected, e.g., using a network, to other processor devices or peripheral devices.

In a networked deployment, the processor device may operate in the capacity of a server or as a client user computer in a server-client user network environment, or as a peer processor device in a peer-to-peer (or distributed) network environment. The processing system 400 can also be implemented as or incorporated into, for example, a portable display device. Further, while a single processing system 400 is illustrated, the term "system" shall also be taken to include any collection of systems or sub-systems that individually or jointly execute a set, or multiple sets, of instructions to perform one or more computer functions.

The processing system 400 may include a processor 402, e.g., a central processing unit (CPU), a graphics processing unit (GPU), or both. Moreover, the processing system 400 can include a main memory 404 and a static memory 406 that can communicate with each other via a bus 408. As shown, the processing system 400 may further include a video display unit 410, such as a liquid crystal display (LCD), an organic light emitting diode (OLED), a flat panel display, a solid state display, or a cathode ray tube (CRT). Additionally, the processing system 400 may include an input device 412, such as a keyboard, and a cursor control device 414, such as a mouse. The processing system 400 can also include a disk drive unit 416, a signal generation device 418, such as a speaker, and a network interface device 420.

In a particular embodiment, as depicted in FIG. 4, the disk drive unit 416 may include a computer readable storage device 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the processing system 400. The main memory 404 and the processor 402 also may include computer readable media. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and processor devices. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented, in whole or in part, by software programs executable by a processor device. The present disclosure contemplates a computer readable storage device that includes instructions or receives and provides instructions for execution responsive to a propagated signal, so that a device connected to a network can communicate voice, video or data over the network 426. Further, the instructions 424 may be transmitted or received over the network 426 via the network interface device 420.

In one embodiment, rather than being software instructions that directly implement the functionality described herein, the instructions 424 instead can implement design instructions representative of a hardware implementation of the above-described functionality that are then synthesized to determine the electrical and electronic design for a processing device that implements the above-described invention. To illustrate, these hardware-design instructions can include register transfer level (RTL) instructions, Verilog instructions, and the like.

While the computer readable storage device is shown to be a single storage device, the term "computer readable storage device" includes a single storage device or multiple storage devices, such as a centralized or distributed database, and/or associated caches and servers that store one or more sets of instructions. The term "computer readable storage device" shall also include any storage device that is capable of storing a set of instructions for execution by a processor or that cause a processor device to perform any one or more of the methods or operations disclosed herein.

In a particular embodiment, the computer readable storage device can include a solid-state memory such as a memory card or other package that houses one or more non-volatile read-only memories. Further, the computer readable storage device can be a random access memory or other volatile re-writeable memory. Additionally, the computer readable storage device can include a magneto-optical or optical medium. Accordingly, the disclosure is considered to include any one or more of a computer readable storage device or a distribution medium and other equivalents and successor media, in which data or instructions may be stored.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A video processing device comprising:
an input to receive pixel values for a set of pixels, the set of pixel values comprising a pixel window substantially centered around a select pixel that initially has a first pixel value;
a first filter unit to determine a horizontal transient improvement value based on a first non-linear filtering of the pixel values in a horizontal direction of the pixel window, the first non-linear filtering comprising determining a second-order derivative approximation between pixels in the set of pixels that are collinear with the select pixel in the horizontal direction;
a second filter unit to determine a vertical transient improvement value based on a second non-linear filtering of the pixel values in a vertical direction of the pixel window, the second non-linear filtering comprising determining a second-order derivative approximation between pixels in the set of pixels that are collinear with the select pixel in the vertical direction;

a third filter unit to determine a first diagonal transient improvement value based on a third non-linear filtering of the pixel values in a first diagonal direction of the pixel window, the third non-linear filtering comprising determining a second-order derivative approximation between pixels in the set of pixels that are collinear with the select pixel in the first diagonal direction; and an output to provide a second pixel value for the select pixel, the second pixel value based on the first pixel value, the vertical transient improvement value, the horizontal transient improvement value, and the first diagonal transient improvement value.

2. The video processing device of claim 1, further comprising:

a fourth filter unit to determine a second diagonal transient improvement value based on fourth non-linear filtering of the pixel values in a second diagonal direction of the pixel window, the second diagonal direction perpendicular to the first diagonal direction and the fourth non-linear filtering comprising a determining a second-order derivative approximation between pixels in the set of pixels that are collinear with the select pixel in the second diagonal direction; and wherein the second pixel value for the select pixel is further based on the second diagonal transient improvement value.

3. The video processing device of claim 2, further comprising:

a summation module to generate the second pixel value based on a sum of at least the first pixel value, the vertical transient improvement value, the horizontal transient improvement value, the first diagonal transient improvement value, and the second diagonal transient improvement value.

4. The video processing device of claim 1, further comprising:

a summation module to generate a third pixel value based on a sum of at least the first pixel value; the vertical transient improvement value, the horizontal transient improvement value, and the first diagonal transient improvement value; and a linear unsharp mask module to generate the second pixel value based on an application of a linear unsharp mask to the third pixel value.

5. A video processing device comprising:

an input to receive pixel values for a set of pixels, the set of pixel values comprising a pixel window substantially centered around a select pixel that initially has a first pixel value;

a first filter unit to determine a horizontal transient improvement value based on non-linear filtering of the pixel values in a horizontal direction of the pixel window;

a second filter unit to determine a vertical transient improvement value based on non-linear filtering of the pixel values in a vertical direction of the pixel window;

a third filter unit to determine a first diagonal transient improvement value based on non-linear filtering of the pixel values in a first diagonal direction of the pixel window;

wherein each of the first filter unit, the second filter unit, and third filter unit comprises:

a two-dimensional (2D) filter to generate a corresponding smoothed pixel value representative of the select pixel; and a transient improvement module having a first input to receive the corresponding smoothed pixel value, a second input to receive a first corresponding pixel value of a first pixel of the set of pixels that is collinear with the select pixel with respect to a corresponding direction, a third input to receive a second corresponding pixel value of a second pixel of the set of pixels that is collinear with the select pixel with respect to the corresponding direction, and an output to provide a corresponding transient improvement value based on non-linear filtering using the corresponding smoothed pixel value, the first corresponding pixel value, and the second corresponding pixel value.

6. The video processing device of claim 5, wherein:

the first pixel and second pixel are horizontally collinear to the select pixel for the transient improvement module of the first filter unit;

the first pixel and second pixel are vertically collinear to the select pixel for the transient improvement module of the second filter unit;

the first pixel and second pixel are diagonally collinear to the select pixel for the transient improvement module of the third filter unit;

the 2D filter of each of the first filter unit and the second filter unit is to apply a first filter matrix to the pixel window to generate the corresponding smoothed pixel value, the first filter matrix deemphasizing the pixels of the pixel window that are vertically collinear and horizontally collinear to the select pixel; and the 2D filter of the third filter unit is to apply a second filter matrix to the pixel window to generate the corresponding smoothed pixel value, the second filter matrix deemphasizing the pixels of the pixel window that are diagonally collinear to the select pixel.

7. The video processing device of claim 5, wherein the transient improvement module comprises:

a first-order derivative module to generate a first value approximating a first-order derivative using the corresponding smoothed pixel value, the first corresponding pixel value, and the second corresponding pixel value;

a second-order derivative module to generate a second value approximating a second-order derivative using the corresponding smoothed pixel value, the first corresponding pixel value, and the second corresponding pixel value;

a gain control module to generate a scaling value based on the first value; and a multiplier module to generate a third value based on a scaling of the second value by the first value, the third value representative of the corresponding transient improvement value.

8. The video processing device of claim 7, further comprising:

a shoot suppression module to provide, as a value representing the corresponding transient improvement value, a select one of the third value, a fourth value, or a fifth value based on the second value;

wherein the fourth value is based on a scaling factor, the corresponding smoothing value, and a maximum value of the corresponding smoothing value, the first corresponding value, and the second corresponding value; and wherein the fifth value is based on the scaling factor, the corresponding smoothing value, and a minimum value of the corresponding smoothing value, the first corresponding value, and the second corresponding value.

9. The video processing device of claim 7, wherein the shoot suppression module comprises:
a factor calculation module to determine the scaling factor based on the first value and the second value; and
selection logic to select from the third value, the fourth value, and the fifth value as the value representing the corresponding transient improvement value based on comparisons of the second value to the minimum value and the maximum value.

10. The video processing device of claim 1, wherein the pixel window comprises a 3×3 pixel window.

11. The video processing device of claim 5, further comprising:
a summation module to generate the second pixel value based on a sum of at least the first pixel value, the vertical transient improvement value, the horizontal transient improvement value, and the first diagonal transient improvement value.

12. The video processing device of claim 5, further comprising:
a summation module to generate a third pixel value based on a sum of at least the first pixel value, the vertical transient improvement value, the horizontal transient improvement value, and the first diagonal transient improvement value; and
a linear unsharp mask module to generate the second pixel value based on an application of a linear unsharp mask to the third pixel value.

13. The video processing device of claim 5, wherein the pixel window comprises a 3×3 pixel window.

14. A method comprising:
receiving, at a video processing device, pixel values for a set of pixels, the set of pixels comprising a pixel window substantially centered around a select pixel that initially has a first pixel value;
determining a horizontal transient improvement value based on a first non-linear filtering of the pixel values in a horizontal direction of the pixel window, the first non-linear filtering comprising determining a second-order derivative approximation between pixels in the set of pixels that are collinear with the select pixel in the horizontal direction;
determining a vertical transient improvement value based on a second non-linear filtering of the pixel values in a vertical direction of the pixel window, the second non-linear filtering comprising determining a second-order derivative approximation between pixels in the set of pixels that are collinear with the select pixel in the horizontal direction;
determining a first diagonal transient improvement value based on a third non-linear filtering of the pixel values in a first diagonal direction of the pixel window, the third first non-linear filtering comprising determining a second-order derivative approximation between pixels in the set of pixels that are collinear with the select pixel in the first diagonal direction; and
generating a second pixel value for the select pixel, the second pixel value based on the first pixel value, the vertical transient improvement value, the horizontal transient improvement value, and the first diagonal transient improvement value.

15. The method of claim 14, further comprising:
determining a second diagonal transient improvement value based on a fourth non-linear filtering of the pixel values in a second diagonal direction of the pixel window, the second diagonal direction perpendicular to the first diagonal direction, and the fourth non-linear filtering comprising determining a second-order derivative approximation between pixels in the set of pixels that are collinear with the select pixel in the second diagonal direction; and
wherein generating the second pixel value comprises generating the second pixel value further based on the second diagonal transient improvement value.

16. The method of claim 14, wherein generating the second pixel value comprises generating the second pixel value based on a sum of at least the first pixel value, the vertical transient improvement value, the horizontal transient improvement value, and the first diagonal transient improvement value.

17. The method of claim 16, wherein generating the second pixel value further comprises applying a linear unsharp mask to the sum.

18. A method comprising:
receiving, at a video processing device, pixel values for a set of pixels, the set of pixels comprising a pixel window substantially centered around a select pixel that initially has a first pixel value;
generating a first smoothed pixel value representative of the select pixel using a first filter matrix that deemphasizes the pixels of the pixel window that are horizontally collinear or vertically collinear to the select pixel;
generating a second smoothed pixel value representative of the select pixel using a second filter matrix that deemphasizes the pixels of the pixel window that are diagonally collinear to the select pixel;
determining a horizontal transient improvement value based on the first smoothed pixel value and based on a pixel value of each of two pixels of the set of pixels that are horizontally collinear with the select pixel;
determining a vertical transient improvement value based on the first smoothed pixel value and based on a pixel value of each of two pixels of the set of pixels that are vertically collinear with the select pixel;
determining a first diagonal transient improvement value based on the second smoothed pixel value and based on a pixel value of each of two pixels of the set of pixels that are positively diagonally collinear with the select pixel; and
generating a second pixel value for the select pixel, the second pixel value based on the first pixel value, the vertical transient improvement value, the horizontal transient improvement value, and the first diagonal transient improvement value.

19. The method of claim 18, wherein determining a corresponding one of the horizontal, vertical, and first diagonal transient improvement values comprises:
generating a first value approximating a first-order derivative of a corresponding smoothing value of the first or second smoothed pixel values, and pixel values of two corresponding collinear pixels of the first set of pixels;
generating a second value approximating a second-order derivative of the corresponding smoothed pixel value and the pixel values of the two corresponding collinear pixels;
determining a scaling value based on the first value; and
generating a third value based on a scaling of the second value by the first value, the third value representative of the corresponding transient improvement value.

20. The method of claim 19, further comprising:
determining a scaling factor based on a sum of the first value and the second value;
determining a fourth value based on the scaling factor, the corresponding smoothing value, and a maximum value of the corresponding smoothing value, the first corresponding value, and the second corresponding value;
determining a fifth value based on the scaling factor, the corresponding smoothing value, and a minimum value of the corresponding smoothing value, the first corresponding value, and the second corresponding value; and
providing, as a value representing the corresponding transient improvement value, a select one of the third value, a fourth value, or a fifth value based on a comparison of the second value to at least one of the minimum value or the maximum value.

21. An edge-enhancement filter unit comprising:
an input to receive pixel values for a set of pixels, the set of pixels comprising a pixel window substantially centered around a select pixel;
an output to provide a direction-specific transient improvement value for edge enhancement of the select pixel;
a two-dimensional filter module to apply a filter matrix to the pixels values to generate a smoothed pixel value for the select pixel; and
a transient improvement module comprising:
　an input to receive the smoothed pixel value, a first pixel value for a first pixel collinear with the select pixel with respect to a corresponding direction, and a second pixel value for a second pixel collinear with the select pixel with respect to the corresponding direction;
　a first-order derivative module to generate a first value approximating a first-order derivative of the smoothed pixel value, the first pixel value, and the second pixel value;
　a second-order derivative module to generate a second value approximating a second-order derivative of the smoothed pixel value, the first pixel value, and the second pixel value;
　a coring filter to generate a third value based on the second value, wherein the coring filter is to provide a value of zero as the third value responsive to the second value falling within a predetermined range and to provide the second value as the third value responsive to the second value falling outside the predetermined range;
　a look-up table to provide a fourth value based on the first value; and
　a multiplier to generate a fifth value by multiplying the fourth value by the third value;
　wherein the direction-specific transient improvement value is based on the fifth value.

22. The edge enhancement filter unit of claim 21, further comprising:
a shoot suppression module comprising:
　an input to receive the smoothed pixel value, the first pixel value, and the second pixel value;
　a min/max module to generate sixth value based on a scaling factor, the smoothing value, and a maximum value of the smoothing value, the first pixel value, and the second pixel value and to generate seventh value based on the scaling factor, the smoothing value, and a minimum value of the smoothing value, the first pixel value, and the second pixel value;
　selection logic to generate control signaling based on a comparison of the fifth value to at least one of the maximum value and the minimum value; and
　a multiplexer to output as the direction-specific transient improvement value a select one of the fifth value, the sixth value, or the seventh value based on the control signaling.

23. The edge enhancement filter unit of claim 21, wherein the shoot suppression module further is to determine the scaling factor based on a sum of the first value and the second value.

* * * * *